(12) United States Patent
Nolan et al.

(10) Patent No.: US 10,026,432 B1
(45) Date of Patent: Jul. 17, 2018

(54) INTERLAYER STRUCTURE FOR HEAT ASSISTED MAGNETIC RECORDING

(71) Applicant: Seagate Technology LLC, Cupertino, CA (US)

(72) Inventors: Thomas P. Nolan, Fremont, CA (US); Kai Chieh Chang, Pleasanton, CA (US); Yukiko Kubota, Campbell, CA (US); Yingguo Peng, San Ramon, CA (US); Jan-Ulrich Thiele, Sunnyvale, CA (US)

(73) Assignee: Seagate Technology LLC, Cupertino, CA (US)

( * ) Notice: Subject to any disclaimer, the term of this patent is extended or adjusted under 35 U.S.C. 154(b) by 1068 days.

(21) Appl. No.: 13/789,312

(22) Filed: Mar. 7, 2013

Related U.S. Application Data

(60) Provisional application No. 61/728,772, filed on Nov. 20, 2012.

(51) Int. Cl.
*G11B 5/66* (2006.01)
*G11B 5/738* (2006.01)

(52) U.S. Cl.
CPC .................................... *G11B 5/738* (2013.01)

(58) Field of Classification Search
CPC ........... G11B 5/65; G11B 5/7325; G11B 5/66; G11B 5/82; G11B 5/746; G11B 5/855; G11B 5/653; G11B 5/851; G11B 5/656; G11B 5/667; G11B 5/743; G11B 5/84; G11B 5/732; G11B 5/738; G11B 5/64;

(Continued)

(56) References Cited

U.S. PATENT DOCUMENTS 7,820,064 B2  10/2010  Sungho
7,901,801 B2   3/2011  Oikawa et al.
(Continued)

FOREIGN PATENT DOCUMENTS

JP  200619000   1/2006
JP  2009295212  12/2009

OTHER PUBLICATIONS

Morrow et al. (Texture of Ru columns grown by oblique angle sputter deposition, Department of Physics, Applied Physics and Astronomy, Rensselaer Polytechnic Institute, Troy, New York, 12180-3590, 235-245).*

*Primary Examiner* — Holly Rickman
*Assistant Examiner* — Linda Chau
(74) *Attorney, Agent, or Firm* — Hollingsworth Davis, LLC

(57) ABSTRACT

A magnetic stack includes a interlayer structure and a magnetic recording layer disposed over the interlayer in the magnetic stack. The magnetic recording layer includes substantially ordered $L_{10}$, <001> oriented crystalline magnetic grains laterally separated by a nonmagnetic, segregant material. The interlayer structure comprises a first layer having cubic crystal structure including <100> oriented crystalline grains and a second layer having crystalline grains laterally separated by a segregant material. The crystalline grains of the second layer are arranged in substantially vertically contiguous alignment with the crystalline grains of the first layer and the segregant material of the magnetic recording layer is arranged in substantially vertically contiguous alignment with the segregant material of the second layer.

16 Claims, 9 Drawing Sheets

(58) Field of Classification Search
CPC ..... G11B 5/7315; G11B 5/8404; G11B 5/314;
G11B 5/73; G11B 5/1278; G11B 5/647;
G11B 5/6088; G11B 5/645; G11B 5/72;
G11B 5/02; G11B 5/3146; G11B 5/4866;
G11B 5/68; G11B 5/70615; G11B
5/70626; G11B 5/012; G11B 5/09; G11B
5/11; G11B 5/235; G11B 5/3106; G11B
5/3133; G11B 5/3153; G11B 2005/0021;
G11B 2005/0024; G11B 2005/0029;
G11B 2005/0005; G11B 11/10584; G11B
11/10534; G11B 11/10543; G11B
11/10554; G11B 11/10582; G11B
11/10586; G11B 11/10589; G11B 13/08;
G11B 2020/10898; G11B 20/10
See application file for complete search history.

(56) References Cited

U.S. PATENT DOCUMENTS

| | | | |
|---|---|---|---|
| 2005/0196650 A1* | 9/2005 | Suwa et al. | 428/848 |
| 2005/0202287 A1 | 9/2005 | Lu et al. | |
| 2005/0214588 A1* | 9/2005 | Iwasaki et al. | 428/831 |
| 2008/0074776 A1 | 3/2008 | Soeya | |
| 2009/0136782 A1 | 5/2009 | Lu | |
| 2009/0162698 A1 | 6/2009 | Yuasa et al. | |
| 2011/0235479 A1* | 9/2011 | Kanbe et al. | 369/13.32 |

* cited by examiner

INTERLAYER STRUCTURE FOR HEAT ASSISTED MAGNETIC RECORDING

RELATED APPLICATIONS

This application claims the benefit of Provisional Patent Application Ser. No. 61/728,772 filed on Nov. 20, 2012, to which priority is claimed pursuant to 35 U.S.C. § 119(e) and which is hereby incorporated herein by reference in its entirety.

SUMMARY

Various embodiments describe a magnetic stack that includes a interlayer structure and a magnetic recording layer disposed over the interlayer in the magnetic stack. The magnetic recording layer includes substantially ordered $L_{10}$, <001> oriented crystalline magnetic grains laterally separated by a nonmagnetic, segregant material disposed at grain boundaries of the substantially ordered $L_{10}$, <001> oriented crystalline magnetic grains. The interlayer structure comprises a first layer having cubic crystal structure including <100> oriented crystalline grains and a second layer having crystalline grains laterally separated by a segregant material disposed at grain boundaries of the second layer crystalline grains. The crystalline grains of the second layer are arranged in substantially vertically contiguous alignment with the crystalline grains of the first layer and the segregant material of the magnetic recording layer is arranged in substantially vertically contiguous alignment with the segregant material of the second layer.

These and other features can be understood in view of the following detailed discussion and the accompanying drawings.

DETAILED DESCRIPTION

Figure 1:
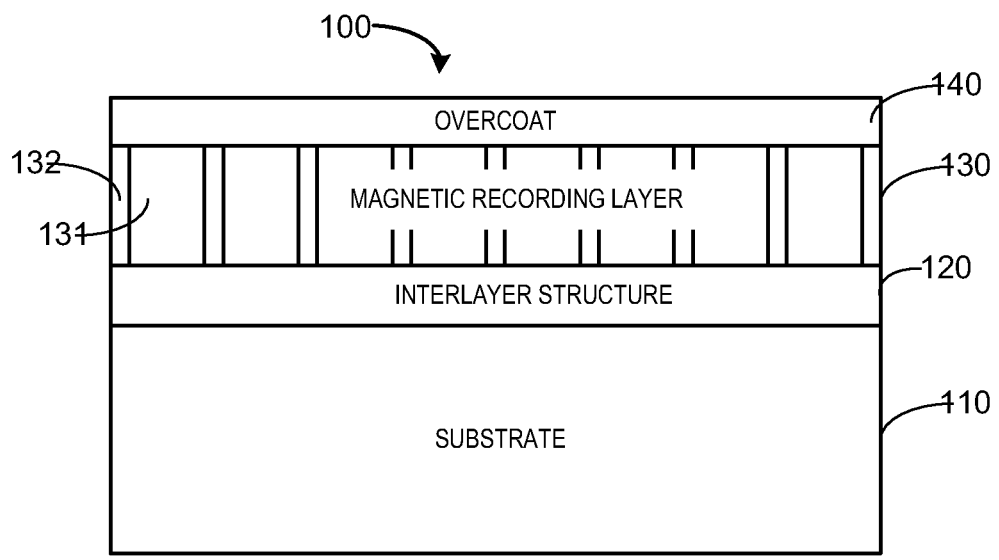
FIG. 1 is an example of stack that includes an interlayer structure in accordance with embodiments described herein.

Higher areal density for magnetic recording can be achieved by decreasing the size of magnetic grains used for magnetic recording media. As grain sizes with a given magnetic anisotropy energy decrease in volume, eventually a thermal stability limit is reached at which random thermally driven magnetic fluctuations at room temperature result in magnetization reversal and corresponding loss of data reliability. To increase the thermal stability limit, materials having higher magnetic anisotropy energy at room temperature can be used to form the magnetic grains. However, higher anisotropy particles require a correspondingly higher write field to change the magnetization orientation of the particles. Writing data to very high magnetic anisotropy materials may necessitate the use of some type of energy assistance to temporarily reduce the magnetic anisotropy energy of the materials while the magnetic write field is applied. For example, one form of energy assisted magnetic recording involves laser light applied to the magnetic medium in a localized area in synchrony with the magnetic write field. The laser generates energy that heats the magnetic material to lower the magnetic anisotropy of the medium, thus allowing the writing of data by the write field. Heat assisted magnetic recording (HAMR) media may incorporate materials and structures to accommodate the relatively high temperatures and high magnetic anisotropies used in the writing process. Formation of the very small particle, high anisotropy materials used for HAMR involves an interlayer structure that provides appropriate orientation, topographical, diffusion, thermal, and other characteristics.

Recording density can be enhanced using a magnetic recording layer comprising magnetic crystalline grains of sufficiently large magnetic anisotropy that are at least partially magnetically decoupled from one another. Magnetic decoupling in the magnetic recording layer can be achieved by a two phase structure including a first material (referred to herein as the primary phase) and a segregant (secondary phase) disposed between regions of the first material. For example, a two phase layer may comprise a primary phase of crystalline grains with a secondary segregant phase located at the boundaries of the crystalline grains. In magnetic recording media, a two phase magnetic recording layer can provide small magnetic grains that are partially or substantially magnetically decoupled.

According to various embodiments discussed herein, magnetic stacks useful for magnetic recording media applications can include an interlayer structure disposed between a substrate and a two phase magnetic recording layer. The interlayer structure can provide one or more functions for the magnetic stack, such as controlling the growth orientation or grain size, providing a nano-rough template that encourages separation of the crystalline grains of the two phase magnetic recording layer, providing a soft magnetic underlayer, providing a thermal resistor, heatsinking, and/or providing a diffusion barrier between various stack layers. In some implementations, several of the above function are combined into one interlayer layer. For example, a single interlayer layer may provide the functions of growth orientation template and thermal resistor.

In some implementations discussed below, a single phase layer of the interlayer structure provides a template having a small grain microstructure with less than 15 nm or even less than 10 nm mean grain diameter. Such small grain size templates may be accomplished by using a high melting temperature material, e.g., materials having melting temperature, $T_m$, greater than about 2000 degrees C., deposited at high sputter pressure, e.g., sputter pressure greater than about 15 mT, or even greater than about 50 mT. In some implementations, the interlayer structure includes a two-phase layer which can also help to provide a small grain structure as well as maintain a small grain structure throughout the layers between the first small grain single phase layer of the interlayer structure and the magnetic layer. In this implementation, the orientation and small grain microstructure initiated within the first layer (single phase) of the interlayer structure is transferred through the subsequently deposited layers (if any) of the interlayer structure and into the magnetic recording layer through coherent growth of vertically contiguous two-phase, grain boundary segregated layers.

FIG. 1 illustrates a magnetic stack 100 that includes an interlayer structure disposed between the magnetic recording layer 130 and the substrate 110. As previously discussed, the interlayer structure may include one or more layers, such as interlayer layer 120, that provide one or more functions or attributes to the magnetic stack. For example, in some cases, the interlayer structure may include interlayer 120 along with one or more additional layers to provide attributes such as crystalline grain orientation, grain size, and/or grain segregation control, diffusion control, and/or thermal control for the magnetic recording layer 130.

In some implementations, the interlayer structure shown in FIG. 1 comprises single-phase layer 120 that provides a bcc <100> template having a small grain microstructure with less than 15 nm or even less than 10 nm mean grain size. Such small grain size templates may be accomplished by using a high melting temperature material, e.g., materials having melting temperature, $T_m$, greater than about 2000 degrees C., such as an alloy of Mo, W, V, or Cr alloy deposited at high sputter pressure, e.g., sputter pressure greater than 15 mT, or even greater than 50 mT.

As illustrated in FIG. 1, the magnetic layer 130 comprises a primary phase of magnetic crystalline grains 131 and a secondary phase comprising a segregant material 132 disposed between the magnetic grains 131. In various embodiments, the crystalline grains 131 of magnetic layer 130 may comprise FePt, FeXPt alloy, $Co_3Pt$, CoXPt alloy, CoX/Pt multilayer, CoXPd alloy, CoX/Pt multilayer, or TbFeCo. For example, in some embodiments, the magnetic crystalline grains 131 comprise substantially ordered $L_{10}$ FePt alloy.

The segregant 132 of the magnetic layer may be nonmagnetic, may be amorphous and/or may comprise one or more of C, $SiO_2$, $Al_2O_3$, $Si_3N_4$, BN, or another alternative oxide, nitride, boride, or carbide material. The orientation of the crystalline grains 131 can be <001> to provide a preferred magnetization axis perpendicular to the stack surface. The crystalline grains of the magnetic layer 130 may have average volumes between about 100 $nm^3$ and 1000 $nm^3$, or even smaller. The two-phase magnetic layer 130 may be selected to grow coherently on the interlayer structure that includes at least layer 120, with cubic-on-cubic, grain-to-grain epitaxial growth. A protective layer 140 is disposed over the magnetic recording layer 130.

Figure 2A:
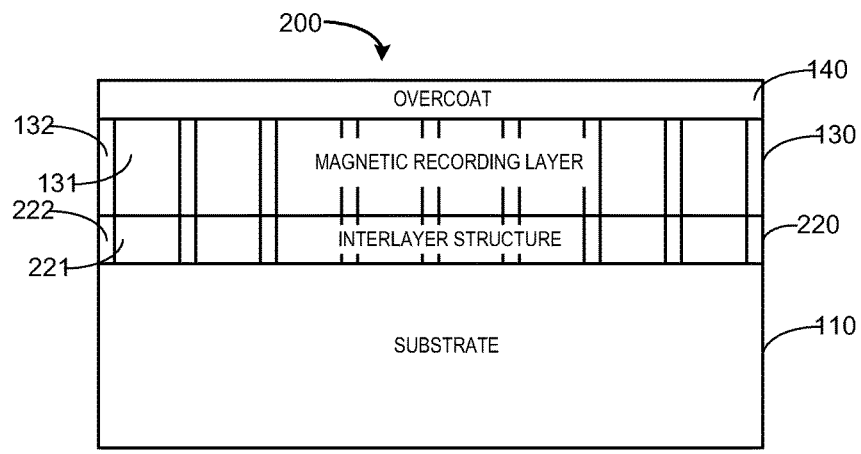
FIG. 2A is an example of stack that includes an interlayer structure comprising a two phase interlayer in accordance with some embodiments.

FIG. 2A illustrates an example of stack 200 that includes an interlayer structure comprising a two phase interlayer 220. Layer 220 serves to control the growth orientation, size, and/or separation of the crystalline grains of the two phase magnetic recording layer 130. In various implementations, layer 220 can provide a template having a small grain microstructure with less than 15 nm or even less than 10 nm mean grain size. Such small grain size templates may be accomplished by using a high melting temperature material, e.g., materials having melting temperature, $T_m$, greater than about 2000 degrees C., deposited at high sputter pressure, e.g., sputter pressure greater than 15 mT, or even greater than 50 mT.

The orientation and small grain microstructure initiated within the interlayer 220 is transferred through the subsequently deposited layers of the magnetic stack and into the magnetic recording layer 130 through coherent growth of vertically contiguous two-phase, grain boundary segregated layers. In addition to the two phase layer 220, the interlayer structure may include any number of additional layers that provide various functions within the stack 200, such as providing an orientation template for stack layers, increasing the separation between the grains, providing thermal conductivity, and/or reducing diffusion of species between layers in the stack.

In the example of FIG. 2A, the interlayer 220 comprises a primary phase 221 and a secondary phase 222. For example, the interlayer primary phase 221 may comprise crystalline grains and the secondary phase 222 may comprise a segregant disposed between the grains. The interlayer 220 can serve as a template that initiates or propagates the orientation, size, and/or separation of the crystalline grains of the after-deposited layers, such as the crystalline grains 131 of the magnetic recording layer 130. During growth of the stack 200, the magnetic crystalline grains 131 of the magnetic layer 130 grow on the primary phase 221 of the interlayer 220 and the magnetic layer segregant 132 grows on the interlayer segregant 222. In some cases, the crystalline grains 221 of the interlayer primary phase have a cubic crystalline structure, e.g., face centered cubic (fcc) or body centered cubic (bcc) structure. In these cases, magnetic grains 131, having a nearly cubic structure, e.g., fcc (or ordered $L_{10}$ FePt), can grow on the interlayer crystalline grains 221 by cubic-on-cubic, grain-to-grain epitaxial growth. Such a growth process facilitates control of the crystalline grain orientation, grain size, and/or grain segregation of the magnetic layer 130.

Separation of the magnetic layer crystalline grains 131 can be controlled by selection of materials for the interlayer primary phase 221 and segregant phase 222. For example, the two phases 221, 222 of the interlayer 220 may be selected so that the interface energy of the magnetic layer crystalline grains 131 of the magnetic layer 130 is lower for the interlayer primary phase 221 than for the interlayer segregant phase 222. The lower interface energy encourages preferential nucleation and growth of the magnetic crystalline grains on the interlayer primary phase 221. The magnetic layer segregant 132 grows between the magnetic layer crystalline grains 131 on the interlayer segregant 222. By appropriate selection of materials for the primary 221, 131 and segregant 222, 132 phases of the interlayer 220 and the magnetic recording layer 130, respectively, the two phase interlayer 220 can transfer the grain orientation, grain size and/or grain separation of the interlayer 220 to the magnetic layer 130.

In some configurations, the primary phase 221 of the interlayer 220 comprises a bcc crystalline phase having a <100> growth orientation separated by a secondary phase 222 of an amorphous material. In some cases, the primary phase 221 of the interlayer 220 can be a Cr-alloy and the amorphous segregant 222 may comprise C, $SiO_2$, $Al_2O_3$, $Si_3N_4$ and/or other oxides, nitrides, carbides, or borides, for example. In some cases, the primary phase 221 of the interlayer 220 can be an alloy comprising bcc elements such as Mo, W, or V.

In some configurations, the primary phase 221 of the interlayer 220 comprises bcc <100> MgO and the segregant phase 222 comprises a material that phase separates when sputtered with MgO. For example, the segregant material could be a stable high melting temperature material that does not have high solubility in MgO such as C, or a carbide, a nitride (e.g., BN, $Si_3N_4$), an oxide (e.g., $SiO_2$, $TiO_2$, $Al_2O_3$), or a boride. In some cases, the segregant material could be a material having high electrical conductivity to enable sputtering of a composite target. In this implementation, the segregant material could be a conductive oxide, such as indium tin oxide (ITO) or aluminum zinc oxide (AZO)

and/or could be a nitride such as TiN, or could be a metallic material such as Ti, Ru, Mo, Ag.

Some embodiments employ materials for the primary phase 221 including <100> TiN and/or <10$\bar{1}$x> hcp Ru or Re, where x can be any integer. Ru and Re are high melting temperature materials capable to transfer oriented growth to the primary phase 131 (e.g., FePt primary phase) of the magnetic recording layer. These embodiments may also include a secondary phase 222 interlayer segregant material such as $SiO_2$, $TiO_2$, or a carbide, nitride, oxide, or boride to assist in grain isolation by controlling a lower interface energy between interface and magnetic layer primary phases, and a higher interface energy between respective primary and segregant phases.

In various embodiments, the secondary phase material is selected such that the addition of the secondary phase material does not damage the oriented granular growth of the interlayer primary phase material and so that oriented grain growth of the subsequent magnetic layer 130 can be achieved. The secondary phase segregant is generally 10-40 volume percent of the interface layer 220 so as to enable formation of the secondary phase 222 at the grain boundaries of the primary crystalline phase 221 while at the same time having the majority (more than 50%) of the interface film 220 comprising the primary crystalline phase. In many embodiments, the secondary phase segregant is an amorphous phase, but a crystalline secondary phase may alternatively be employed. Thickness of the interlayer 220 may take on a range of values, but is generally preferred to be relatively thin (e.g., less than about 20 nm) so as to limit the spacing between the HAMR recording head and the heatsink and SUL layers, as well as to reduce manufacturing costs.

As previously discussed, the magnetic recording layer 130 includes a primary crystalline phase 131 comprising a magnetic material and a secondary phase 132 comprising non-magnetic material disposed at the grain boundaries between the magnetic crystalline phase 131. The primary phase 131 of the magnetic recording layer can be a magnetic material having an fcc or $L_{10}$ crystalline structure (e.g., an ordered $L_{10}$ alloy such as FePt or FePtCu) with <001> oriented crystalline grains laterally separated by a secondary phase 132 of non-magnetic material at the grain boundaries. The interlayer 220 and the magnetic layer 130 can be grown so that the grain boundaries 132 of the primary phase 131 of the magnetic layer 130 substantially vertically aligns with the grain boundaries 222 of the primary phase 221 of the interlayer 220.

Figure 2B:
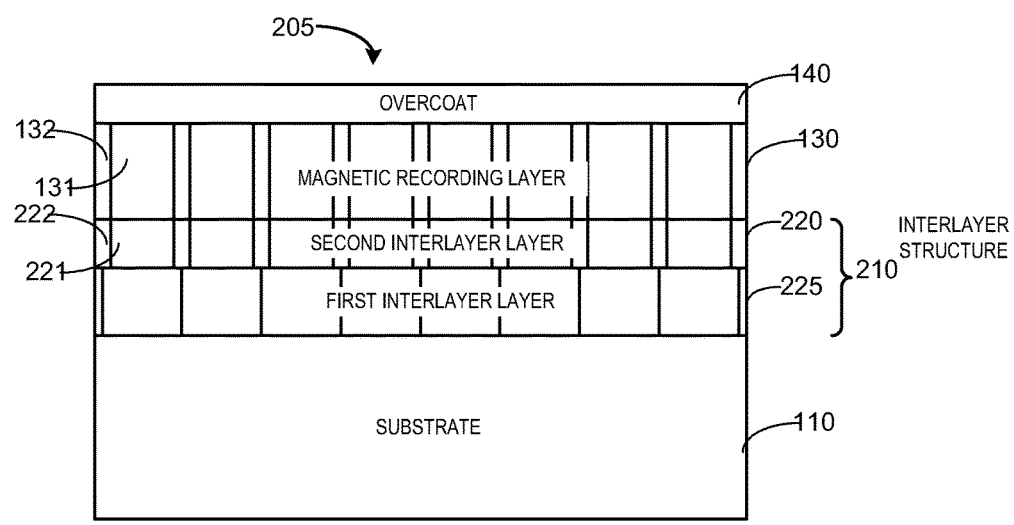
FIG. 2B shows an interlayer structure that includes a first layer having a small grain crystalline microstructure without the segregant phase in accordance with some embodiments.

In some cases, as illustrated in FIG. 2B, the interlayer structure 210 includes a first layer 225 comprising a small grain crystalline microstructure without the segregant phase similar to layer 120 discussed in connection with FIG. 1. A second layer 220 of the interlayer structure 210 is grown in vertically contiguous alignment with the first layer 225. The second layer 220 is a two phase layer which is similar to layer 220 discussed above in connection with FIG. 2A.

Figure 3:
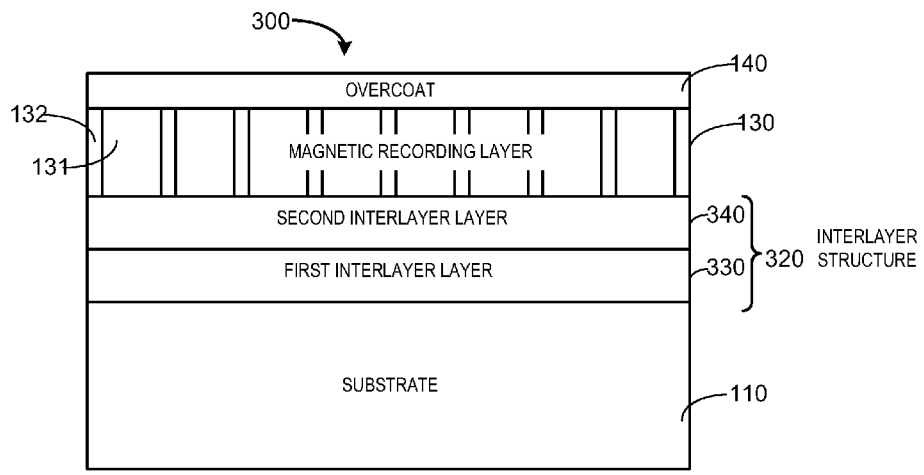
FIGS. 3 and 4 shows interlayer structures comprising multiple layers according to some embodiments.

In some embodiments, the interlayer structure 320 may comprise multiple layers as depicted in FIG. 3. The interlayer structure 320 may include any number of layers that provide various functions within the stack, such as providing an orientation template for stack layers, increasing the separation between the grains, providing thermal conductivity, and/or reducing diffusion of species between layers in the stack. In the example of FIG. 3, the interlayer structure 320 comprises two layers 330, 340. One or both of the two layers 330, 340 may be single or dual phase layers, for example. In some cases, layers 330, 340 are single phase layers. For example, layer 330 may comprise a <100> bcc initial template, comprising materials such as a Cr, Mo, W, or V or alloys thereof, bcc oxides or nitrides such as MgO or TiN, fcc metals such as Pt, Cu, or CuPt, hcp materials like Ru, Re, Ti, or alloy thereof, or ordered materials like RuAl or NiAl. Layer 340 is disposed over layer 330 and may comprise the same material or another of materials, e.g., bcc oxides or nitrides such as MgO or TiN, fcc metals such as Pt, Cu, or CuPt, ordered materials like RuAl or NiAl; or hcp materials like Ru, Re, Ti, or alloy thereof grown coherently on layer 330 to form a <10$\bar{1}$x> oriented film. In some embodiments, layer 340 may comprise a second phase material disposed at the grain boundaries between the primary phase material.

Figure 4:
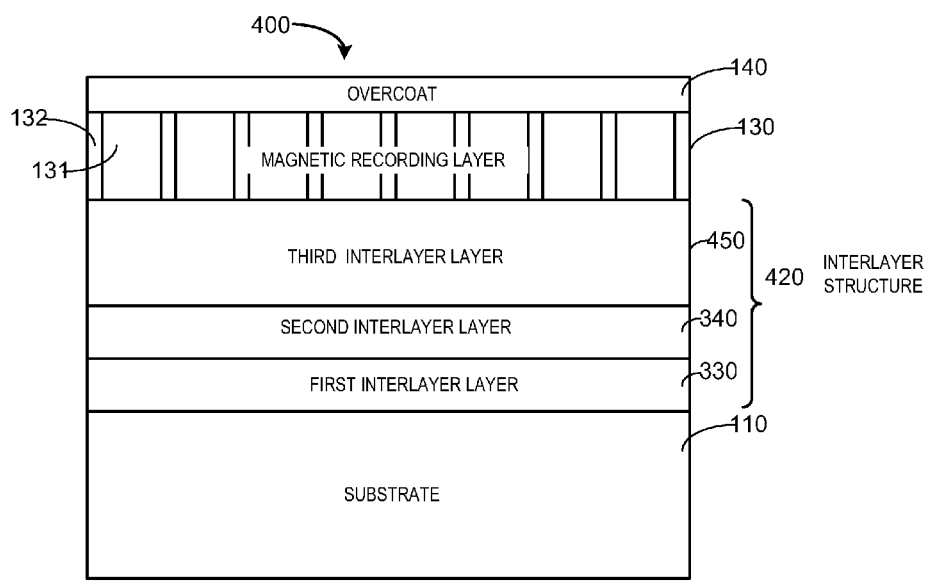

The stack 400 of FIG. 4 provides another example of a multiple layer interlayer structure 420. The interlayer structure 420 may include any number of layers that provide various functions within the stack, such as providing an orientation template for stack layers, increasing the separation between the grains, providing thermal conductivity, and/or reducing diffusion of species between layers in the stack.

Interlayer structure 420 may include layer 330 which (as previously discussed) may be a <100> bcc initial template and comprises materials such as a Cr, Mo, W, or V or alloys thereof, bcc oxides or nitrides such as MgO or TiN, fcc materials such as Pt, Cu, or CuPt, or hcp materials like Ru, Re, Ti, or alloys thereof. Layer 340 is disposed over layer 330 and may comprise the same material or another material, e.g., bcc oxides or nitrides such as MgO or TiN, fcc metals such as Pt, Cu, or CuPt, or hcp materials like Ru, Re, Ti or alloys thereof, grown coherently on layer 330 to form a <10$\bar{1}$x> oriented film. In some embodiments, layer 340 may comprise a second phase material disposed at the grain boundaries between the primary phase material.

In some cases, layer 450 may comprise a second layer grown coherently over the layer 340. Layer 450 may comprise bcc oxides or nitrides such as MgO or TiN, fcc metals such as Pt, Cu, or CuPt, or hcp materials like Ru, Re, Ti, or alloys thereof grown coherently on layer 330 to form a <10$\bar{1}$x> oriented film In some cases, layer 450 is grown coherently and in vertically contiguous alignment over the layer 340 at higher pressure than the pressure used to grow the layer 340. Coherent growth refers to atomic level (atom-to-atom) crystallographic alignment between crystalline regions of the two layers. Vertical contiguous alignment refers to alignment of larger scale features, including features, for example, such as grains, grain boundaries and phases. For example, in some cases, the layer 340 may be grown at a low pressure, e.g., less than about 15 mT with the layer 450 grown at a high pressure, e.g., greater than about 15 mT. The pressures used to grow layers 340, 450 can interact with other factors such as material melting temperature, sputter substrate temperature, and/or sputter rate. Low pressure for such production processes may be considered to be roughly less than about 15 mT whereas high pressure may be considered to be greater than about 15 mT.

Layers of the interlayer structure, e.g., layer 450 can be fabricated to form a nano-rough template to increase grain separation of the magnetic layer 130. For example, layer 340 may be a relatively smooth layer whereas the layer 450 can have nano-scale topographical features, e.g., spaced apart indentations at grain boundaries. These indentations provide a surface roughness, e.g., an electron force microscopy (AFM) measured surface roughness, Ra, on the order of about 0.7 nm to about 0.2 nm, that can assist grain segregation of subsequently deposited layers. Nano-roughness is further observed by increased AFM signal at the highest measurable frequencies, and by TEM cross-section observation of the flatness (or roundedness) of the top of the grains of the layer in question. In some embodiments, the layer 450 may comprise a two phase structure to increase grain separation of the magnetic layer 130. For example, the layer 450 may have a primary phase comprising crystalline grains of Ru-alloy segregated by an oxide, nitride, carbide or boride. The thickness of layer 450 can be on the order of about 5-20 nm.

Figure 5:
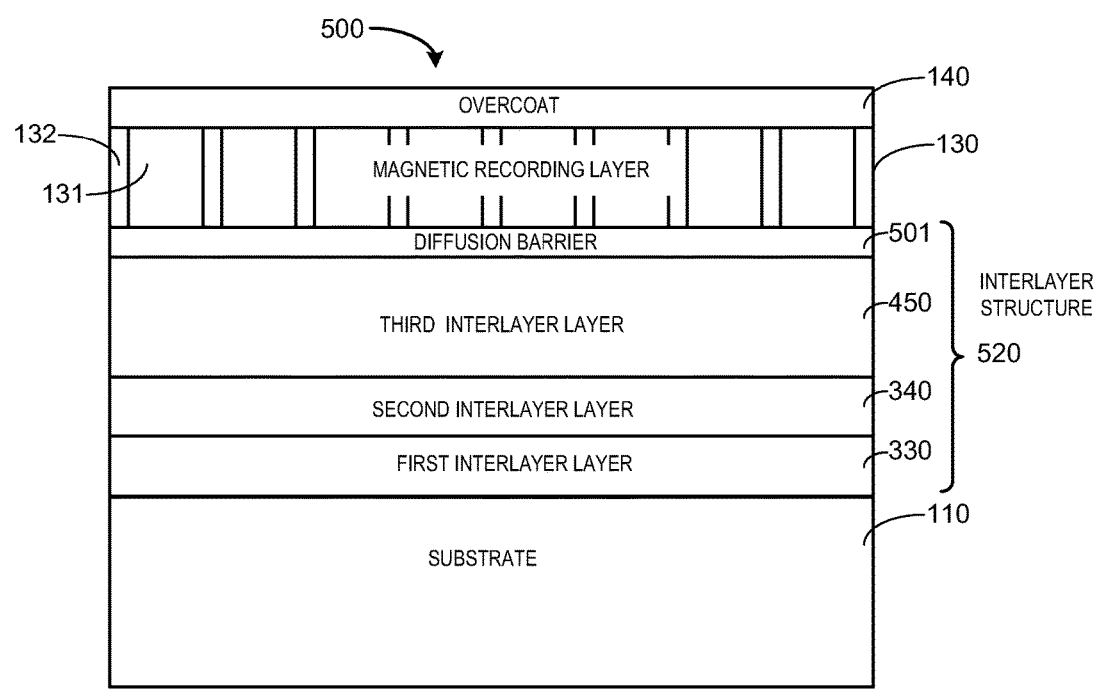
FIG. 5 depicts and interlayer structure comprising multiple layers including a diffusion barrier in accordance with some embodiments.

FIG. 5 depicts a stack 500 that provides yet another example of a multiple layer interlayer structure 520. Stack 500 is similar in some respects to stack 400 of FIG. 4 except that interlayer 520 includes a diffusion barrier layer 501 disposed adjacent the magnetic layer 130. Stack 500 includes layer 330 comprising a <100> bcc initial template, e.g., comprising bcc metals as a Cr, Mo, W, or V alloys, bcc oxides such as MgO and TiN, fcc metals such as Pt, Cu, CuPt, or hcp materials like Ru, Re, Ti, or alloys thereof. In some configurations, layer 340 may comprise a layer grown coherently on layer 330 to form a <10$\bar{1}$x> oriented film. Suitable materials for layer 340 include Ru or Re, among other others. Optionally, the stack includes layer 450, e.g. a grown coherently over layer 340 at higher pressure than the pressure used to grow the first layer 340. Layer 450 may also comprise materials as disclosed above, e.g., Ru or Re, among other materials. In various implementations, the second layer 450 may comprise a single phase layer or a two phase layer. The interlayer structure 520 may also include diffusion barrier layer 501 configured to reduce interdiffusion between the magnetic recording layer 130 and the interlayer 520. In some cases, the diffusion barrier layer 501 may provide a template material for the magnetic layer 130. For example, in some cases, the magnetic recording layer 130 may comprise FePt and the diffusion barrier layer 501 may comprise a template material such as TiN, AZO, ITO, and/or an MgO layer having a thickness less than about 10 nm. The barrier layer 501 may also comprise a 2-phase material to control magnetic layer segregation by similar processes as previously described in connection with interlayer structure 120.

Figure 6:
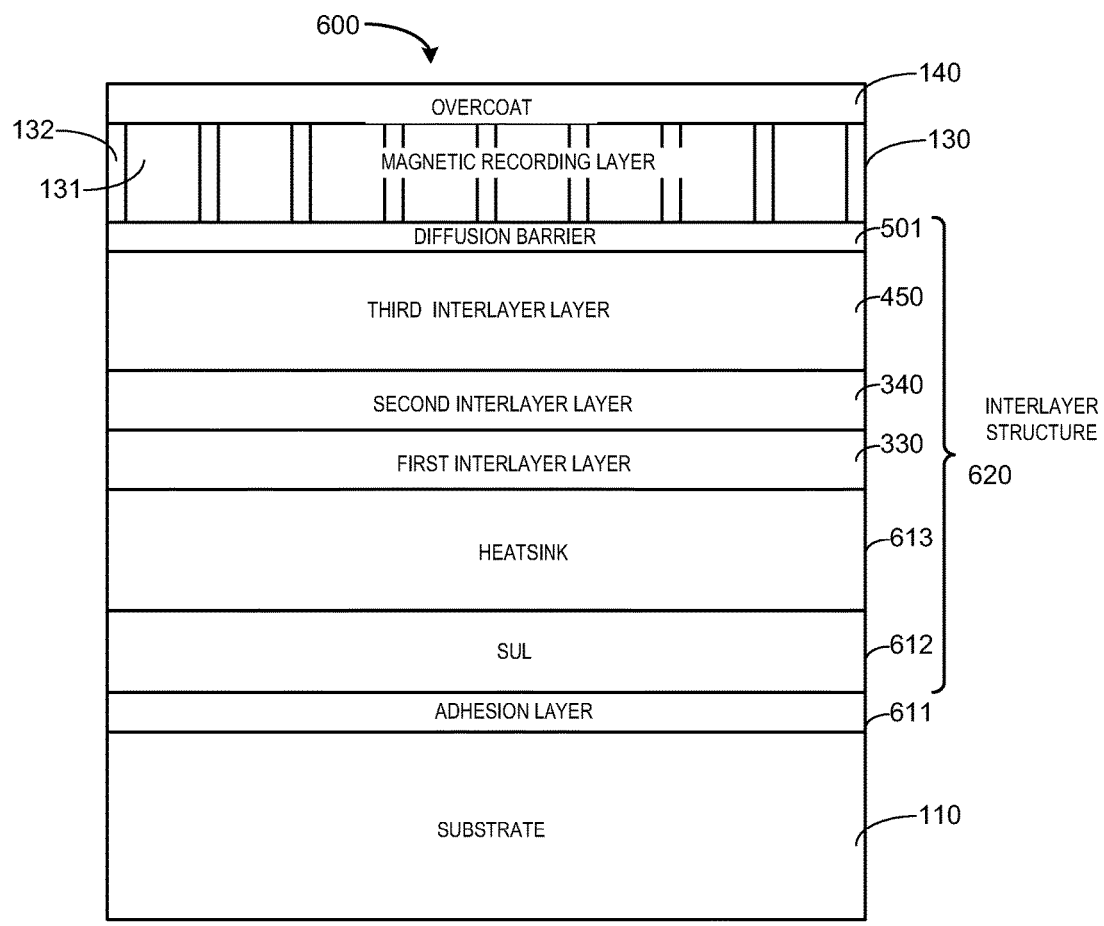
FIG. 6 illustrates an interlayer structure in accordance with some embodiments.

As previously mentioned, it will be appreciated that a magnetic stack may include any number of additional layers, each contributing one or more features or properties to the stack. The stack 600 illustrated in FIG. 6 is similar in some respects to stack 500, except that interlayer structure 620 includes optional additional layers 611-612 and adhesion layer 611. The adhesion layer 611 promotes adhesion between the substrate and the adjacent layer 612 which can help reduce potential delamination from the substrate 110. In some implementations, the adhesion layer 611 may comprise Ta, an alloy including Ta, Ni, W, Ti, Cr, and/or other elements in combination with alloying materials having limited solubility to promote amorphous, nanocrystalline or small grain structure. As shown in FIG. 6, the stack may include a soft underlayer (SUL) 612 configured to enhance the magnetic write field by providing a return path for magnetic flux produced by the magnetic write head during a write operation. The SUL 612 may comprise one or more layers of amorphous materials including Fe or Co, and amorphizing elements such as B, Ta, Zr, Cr, Nb that are commonly used. The SUL 612 may additionally or alternatively comprise one or more crystalline layers.

Some stack implementations may optionally include a one or more heatsink layers 613. Layer 613 is useful in HAMR applications to control the flow of heat created during write operations. For example, layer 613 may serve as a heatsink layer, having thermal conductivity greater than about 20 W/m-K (Watts/meter Kelvin). In various exemplary cases, materials for the heatsink layer 613 can include Cu, Ag, Al, Au, Ni, Mo, W, V, Ru and/or alloys such as CuZr and CuNi. In some implementations, the heatsink layer 613 can have a total thickness ranging from about 10 nm to about 100 nm, and may comprise multiple layers of different materials. If the heatsink 613 includes multiple layers, at least one layer of the multiple layers may have a different thermal conductivity than another of the multiple layers.

Figure 7:
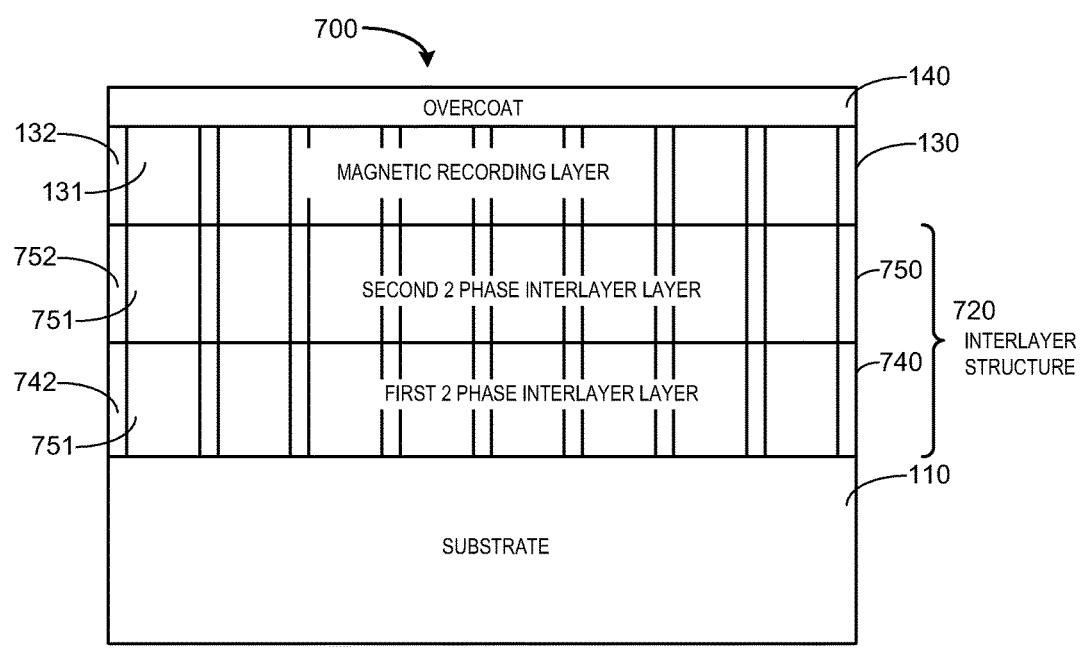
FIGS. 7-9 depict interlayer structures having multiple two phase layers in accordance with some embodiments.

In some implementations, the interlayer structure 720 includes multiple two phase layers 740, 750 as illustrated by the stack 700 of FIG. 7. FIG. 7 includes a multiple layer interlayer structure 720 disposed on a substrate 110. Layer 740 is deposited over the substrate 110 and layer 750 is deposited over layer 740. The magnetic recording layer 130 is deposited over layer 750. Two phase layer 750 includes a primary phase material 751 separated by segregant 752. Two phase layer 740 includes a primary phase material 741 separated by segregant 742. For example, the primary phase material 741, 751 of layers 740, 750 can comprise crystalline grains separated by an amorphous segregant 742, 752. The two phase layers 750, 740 of the interlayer structure 720 and the magnetic recording layer 130 may be grown in vertically contiguous alignment. In various embodiments, the primary phase material 751 of layer 750 may be different from or the same as the primary phase material 741 of layer 740 and/or the segregant 752 of layer 750 may be different from or the same as the segregant 742 of layer 740.

Figure 8:
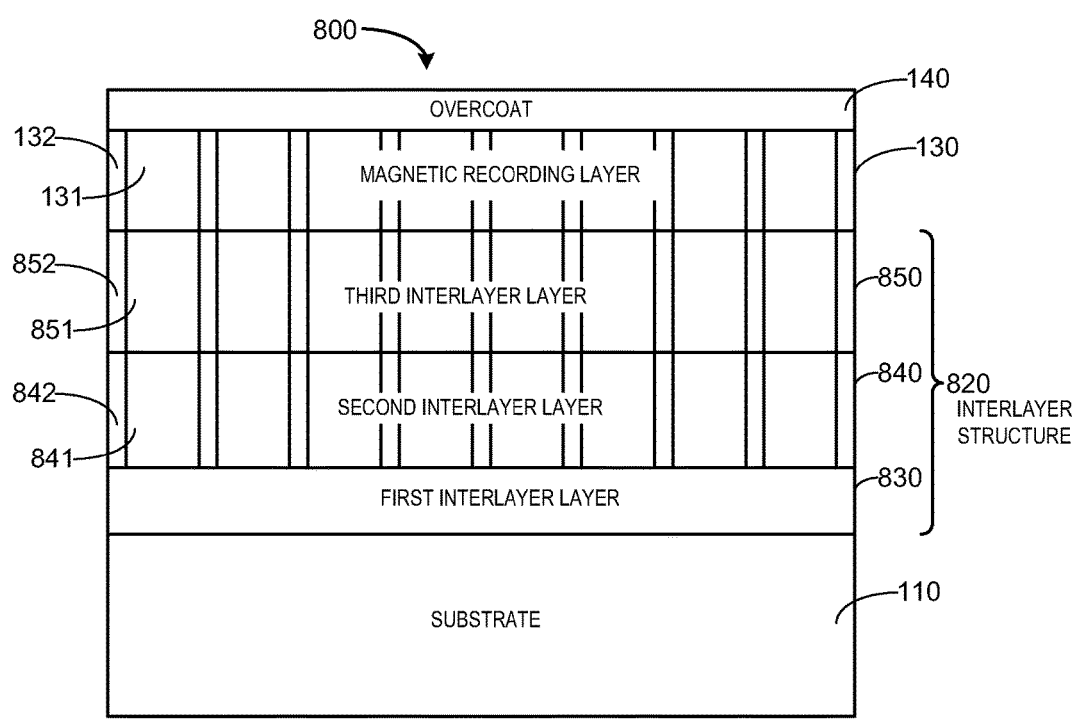

FIG. 8 depicts an example of a stack 800 in accordance with some embodiments. The interlayer structure 820 shown in this example includes layer 830, two phase layer 850, and two phase layer 840, which is an optional layer in this example. The primary phase 851 of layer 850 may include MgO and the segregant phase 852 comprises a material that phase separates when sputtered with MgO. For example, the segregant material 852 could be a stable high temperature material such as C, SiC or other carbide. Other options for the segregant material 852 could be an oxide, e.g., $SiO_2$, $Al_2O_3$, or a nitride that does not have high solubility in MgO, such as $Si_3N_4$. In some cases, the segregant material 852 could be a material having high electrical conductivity to enable sputtering of a composite target. In this implementation, the segregant material 852 could be a conductive oxide, such as indium tin oxide (ITO) or aluminum zinc oxide (AZO) or could be a nitride such as TiN, or could be a metallic material such as Ti, Ru, Mo, Ag.

Layer 830 may be configured to initiate and/or assist in the phase segregation process of subsequent layers of the interlayer 820 and/or of the magnetic recording layer 130. For example, a high pressure sputtered material e.g., sputtered at pressures greater than about 15 mT or even greater than about 50 mT, that has a melting temperature, $T_m$, greater than about 2000 degrees C., may be used in layer 830. In some implementations, layer 830 may comprise Ru or Re. The material of layer 830 can be selected to form small grains and particles on a sub-10 nm scale to assist in defining a similar microstructure in the subsequent MgO layer 850. Optionally, layer 840 may be included having a primary phase material 841 and a segregant 842. For example in some embodiments, the primary phase material includes Ru or Re, and the segregant comprises materials such as $SiO_2$ or other oxide or C. Layer 840 further promotes subsequent segregation of layers including the MgO layer 850 and/or the magnetic layer 130, e.g., comprising FePt. The segregant 842 of layer 840 may be the same material as the segregant 852 of the MgO layer 850 and/or the segregant 132 of the magnetic layer 130. The use of the same materials in the secondary phases 542, 852, 132 of the layers 840, 850, 130 may facilitate stack layers with primary and secondary phase materials that are substantially aligned along the growth axis of the stack 800.

Figure 9:
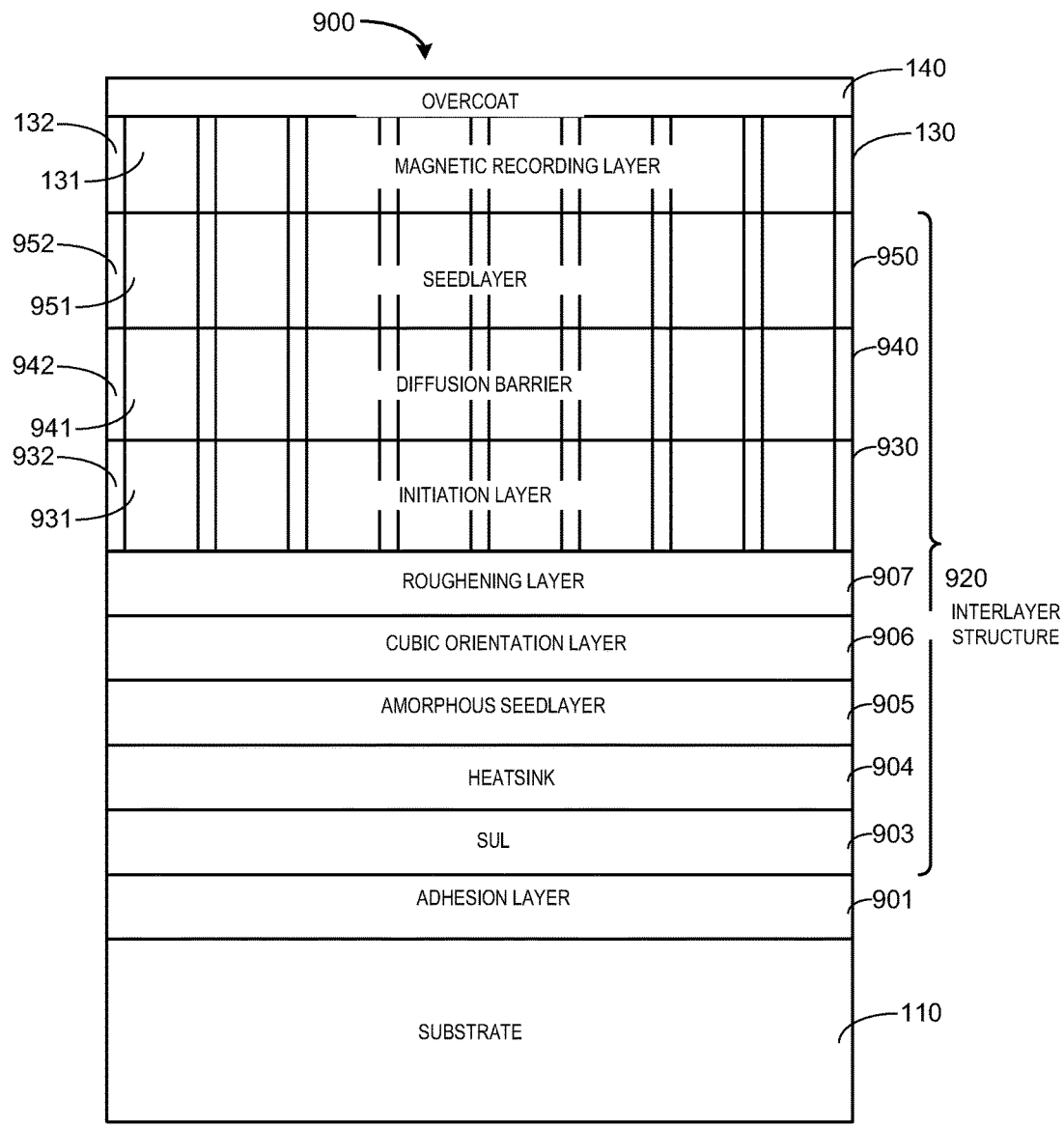

In some implementations, the interlayer structure does not include an MgO layer, as illustrated by stack 900. Example interlayer structures without MgO can comprise multiple layers that provide orientation and small grain template, phase separation, thermal control and diffusion barrier as previously described. For example, these interlayers may comprise bcc metals as a Cr, Mo, W, or V alloys, bcc oxides such as MgO and TiN, fcc metals such as Pt, Cu, CuPt, or hcp materials like Ru or Ti. FIG. 9 illustrates a stack 900 that includes an interlayer structure 920 in accordance with some embodiments. Stack 900 includes the following layers: a substrate 110, e.g., ceramic glass, amorphous glass, aluminum or NiP coated AlMg; an adhesion layer 901, e.g. Ta; a SUL 903, e.g., comprising FeCoB, a heatsink 904, e.g., comprising Cu, an amorphous seed layer 905, e.g., comprising Ta, a cubic orientation layer 906, e.g., a Cr alloy such as CrRu, a roughening layer 907, e.g., comprising Ru or Re, a two phase initiation layer 930, e.g., comprising a primary phase 931 and a segregant 932 (e.g., Ru or Re with an oxide), a two phase diffusion barrier layer 940, e.g., comprising TiN as the primary phase 941 and $SiO_2$ as the segregant 941, a two phase growth seedlayer 950, e.g., comprising Pt as the primary phase 951 and $SiO_2$ as the segregant 952, and a two phase magnetic layer 130, e.g., comprising FePt as the primary phase 131 and $SiO_2$ as the segregant, and overcoat layer 140, e.g., comprising diamond like carbon (DLC).

In some implementations, one or more of the two phase layers of the interlayer structure may function as a thermal resistor disposed in the interlayer stack between the recording layer and the heatsink. The two phase thermal resistor provides thermal conductivity anisotropy to the stack which allows heat to be more rapidly conducted from the recording layer along a direction perpendicular to the stack (towards the heat sink) and to conduct heat more slowly in the lateral direction, to control the thermal spot size during heat assisted recording operations. The thermal resistor layer may also provide other functions within the stack, such as a growth initiation layer and/or seed layer for the magnetic recording layer. A two phase layer adjacent the magnetic recording layer can initiate a low thermal conductivity grain boundary at the start of the magnetic recording layer. For example, such a two phase layer may comprise MgO as the primary phase and C, an oxide, or another low conductivity secondary phase material. This layer may also serve as a growth initiation layer for the magnetic recording layer, e.g., FePt. The interlayer may include an additional two phase seedlayer, e.g., comprising Pt and a low thermal conductivity segregant, wherein the growth initiation layer is disposed between the seedlayer and the magnetic recording layer.

Figure 10:
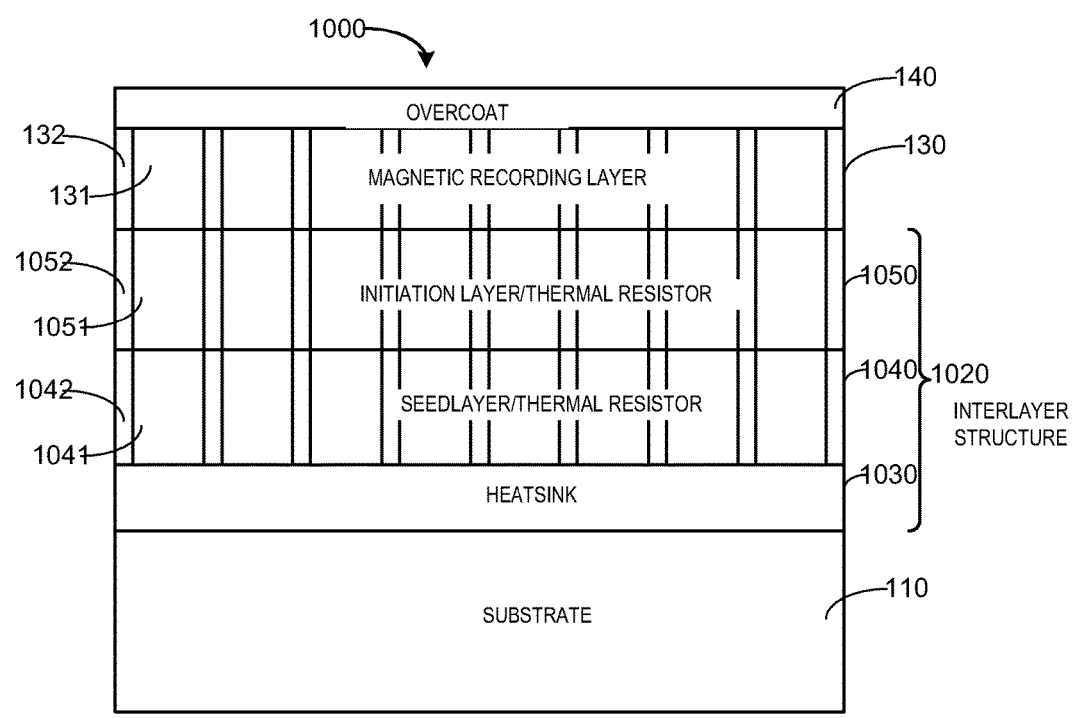
FIG. 10 shows an interlayer structure that includes a heatsink layer according to some embodiments.

FIG. 10 depicts a stack that includes an interlayer structure 1020 comprising a heatsink layer 1030, a two phase seedlayer 1040, and a two phase growth initiation layer 1050. For example, the heatsink may comprise Cu or Mo, the seedlayer 1040 may include Pt or CuPt as the primary phase 1041 and a low thermal conductivity material, e.g., C, a carbide, oxide or nitride, as the secondary phase 1042, and the growth initiation layer may comprise MgO as the primary phase 1051 with a low thermal conductivity material as the secondary phase 1052.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A magnetic stack, comprising:
   an interlayer structure comprising:
      a first layer having cubic crystal structure including <100> oriented crystalline grains; and
      a second layer having crystalline grains laterally separated by a segregant material deposited at grain boundaries of the second layer crystalline grains, the crystalline grains of the second layer substantially vertically contiguously aligned with the crystalline grains of the first layer; and
   a magnetic recording layer disposed on the interlayer structure and comprising substantially ordered $L_{10}$, <001> oriented crystalline magnetic grains laterally separated by a nonmagnetic, segregant material disposed at grain boundaries of the substantially ordered $L_{10}$, <001> oriented crystalline magnetic grains and the magnetic layer segregant material being arranged in substantially vertically contiguous alignment with the segregant material of the second layer.

2. The stack of claim 1, wherein amorphous material is disposed at the grain boundaries of the <100> oriented crystalline grains and comprises C, a carbide, a nitride, a boride, or an oxide.

3. The stack of claim 1, wherein the second layer is disposed over the first layer and comprises a <10$\bar{1}$x> oriented alloy.

4. The stack of claim 3, wherein the interlayer structure includes an additional layer disposed over the second layer, the additional layer comprising crystalline grains separated by a segregant disposed between the crystalline grains.

5. The stack of claim 4, wherein one or both of the additional layer and the second layer comprise Ru or Re.

6. The stack of claim 1, wherein the interlayer structure further includes a diffusion barrier layer disposed adjacent to the magnetic recording layer.

7. The stack of claim 1, wherein the interlayer structure includes a heatsink layer comprising one or more of Cu, Mo, Ru, W, V, Ag, Au, Al, Cr.

8. The stack of claim 1, wherein at least one of the layers of the interlayer structure provides a small grain template having less than about 15 nm grain size.

9. The stack of claim 1, wherein at least one of the first and the second layers of the interlayer structure provides a small grain template having less than about 10 nm grain size.

10. The stack of claim 1, wherein at least one of the first layer and the second layer has a melting temperature, Tm, greater than about 2000 degrees C.

11. A magnetic stack, comprising:
   a magnetic recording layer comprising substantially ordered $L_{10}$, <001> oriented crystalline magnetic grains laterally separated by a nonmagnetic, amorphous segregant material disposed at grain boundaries of the substantially ordered $L_{10}$, <001> oriented crystalline magnetic grains; and
   an interlayer structure disposed between a substrate and the magnetic recording layer, the interlayer including a layer comprising crystalline grains of MgO separated by a segregant deposited at grain boundaries of the crystalline MgO grains, the crystalline magnetic grains and the crystalline MgO grains arranged in substantially vertically contiguous alignment.

12. The stack of claim 11, wherein the segregant deposited at grain boundaries of the MgO crystalline grains comprises an electrically conductive material.

13. The stack of claim 11, wherein the segregant deposited at the grain boundaries of the crystalline MgO grains comprises a metallic material.

14. The stack of claim 11, wherein the segregant deposited at the grain boundaries of the crystalline MgO grains comprises a conductive oxide.

15. The stack of claim 11, wherein the interlayer structure further includes a layer comprising Ru or Re.

16. The stack of claim 15, wherein the layer comprising Ru or Re is a two phase layer including crystalline grains of Ru or Re separated by a segregant.

* * * * *